United States Patent [19]

Viertl

[11] Patent Number: 5,544,953
[45] Date of Patent: Aug. 13, 1996

[54] ROLLING-BALL THERMOELECTRIC POTENTIAL PROBE AND HOUSING FOR NONDESTRUCTIVE TESTING OF METALLIC AND SEMICONDUCTOR OBJECTS

[75] Inventor: John R. M. Viertl, Niskayuna, N.Y.

[73] Assignee: General Electric Co., Schenectady, N.Y.

[21] Appl. No.: 245,269

[22] Filed: May 18, 1994

[51] Int. Cl.⁶ .................. G01K 1/08; G01K 7/00
[52] U.S. Cl. .................. 374/164; 374/153; 374/179; 374/208; 136/230
[58] Field of Search .................. 374/4–7, 137, 374/152–154, 163, 164, 179, 208, 210; 136/221, 229, 230; 73/566.5, 104, 105

[56] References Cited

U.S. PATENT DOCUMENTS

| | | |
|---|---|---|
| Re. 29,166 | 3/1977 | Förster . |
| 2,618,672 | 11/1952 | Cizmadia et al. .................. 136/229 |
| 2,750,791 | 6/1956 | Hanysz et al. . |
| 2,947,171 | 8/1960 | Peltola .................. 374/153 |
| 2,972,882 | 2/1961 | Erwin . |
| 3,016,732 | 1/1962 | Hanysz et al. . |
| 3,191,437 | 6/1965 | Heard, Jr. .................. 374/153 |
| 3,246,519 | 4/1966 | Dornberger .................. 374/153 |
| 3,731,536 | 5/1973 | Baumann et al. .................. 374/153 |
| 3,974,442 | 8/1976 | Savidge et al. . |
| 3,984,768 | 10/1976 | Staples . |
| 4,155,455 | 5/1979 | Spierer et al. . |
| 4,274,054 | 6/1981 | Savidge et al. . |
| 4,290,017 | 9/1981 | Fortunko . |
| 4,409,549 | 10/1983 | Garner et al. . |
| 4,418,315 | 11/1983 | Edwards et al. . |
| 4,437,062 | 3/1984 | Donnelly . |
| 4,518,962 | 5/1985 | Imose et al. .................. 374/154 |
| 4,528,506 | 7/1985 | Davis et al. . |
| 4,542,345 | 9/1985 | Tomasulo . |
| 4,622,517 | 11/1986 | Arnaud et al. . |
| 4,706,021 | 11/1987 | Chamuel . |
| 4,855,676 | 8/1989 | Cecco et al. . |
| 4,855,677 | 8/1989 | Clark, Jr. et al. . |
| 4,877,332 | 10/1989 | Ravensbergen .................. 374/153 |
| 4,920,319 | 4/1990 | Viertl . |
| 4,924,182 | 5/1990 | Vernon et al. . |
| 4,989,154 | 1/1991 | Yamashita et al. . |
| 5,110,218 | 5/1992 | Aizawa et al. .................. 374/153 |
| 5,141,333 | 8/1992 | Ndebi et al. .................. 374/153 |

*Primary Examiner*—William A. Cuchlinski, Jr.
*Assistant Examiner*—Andrew Hirshfeld
*Attorney, Agent, or Firm*—Nixon & Vanderhye

[57] ABSTRACT

A thermoelectric potential probe inspects the surface coating thickness of a turbine bucket blade using a rolling ball probe head to traverse the surface of the bucket. The probe may be hand-held or affixed to a computer controlled robotics coordinate measuring machine. The rolling ball head has embedded heating elements and is a thermal-electric sensor that gathers data regarding the thickness of coating on a turbine surface.

8 Claims, 2 Drawing Sheets

ROLLING-BALL THERMOELECTRIC POTENTIAL PROBE AND HOUSING FOR NONDESTRUCTIVE TESTING OF METALLIC AND SEMICONDUCTOR OBJECTS

RELATED APPLICATIONS

This invention relates to commonly assigned U.S. patent application Ser. No. 08/073,468, entitled "Combined Thermoelectric And Eddy Current Method And Apparatus For Nondestructive Testing Of Metallic And Semiconductor Coated Objects" filed on Jun. 9, 1993, by John Viertl, now U.S. Pat. No. 5,430,376, and which is incorporated by reference here.

FIELD OF THE INVENTION

This invention relates to an apparatus for measuring surface coating thicknesses and flaws in metallic and semiconductive materials. In particular, the invention is a rolling-ball thermoelectric potential probe and housing for measuring the surface coating thickness of a turbine bucket.

BACKGROUND OF THE INVENTION

Turbine buckets (turbine blades) have thin surface coatings of alloy materials to protect the bucket from the detrimental effects of high temperatures and corrosive environments. It is desirable to measure the surface coating thickness and the presence of cracks in the coating. The coating thickness varies to a small degree on buckets and other metal (or semiconductive material) components. Craze cracks that develop in the coating may penetrate into the bucket substrate material. It is important to know whether a crack or other surface flaw has penetrated the surface coating into the underlying bucket substrate material. Accordingly, accurate measurements of the surface thickness coating are needed to determine if a crack or flaw has propagated into the substrate material.

The present invention provides an apparatus for thermoelectric scanning of a turbine bucket to measure the thickness of the surface coating on the bucket. The apparatus in one embodiment is a thermoelectric potential probe having a rolling-ball probe head contacting a surface of a test object. The probe head may be substantially spherical and has at least one internal thermal heating element. The probe head also includes a sensor, such as a thermocouple, for detecting a thermoelectric potential signal from the surface of the bucket. The probe head may be alternatively referred to as a thermoelectric potential probe or thermoelectric probe. A tubular axle is fixedly attached to the probe head for rotating the probe head. A rotational encoder may be connected to the axle for generating electrical signals indicative of rotational movements of the axle. In addition, a probe housing may be used to support and provide a bearing surface for the axle.

DETAILED DESCRIPTION OF THE DRAWINGS

Figure 1:
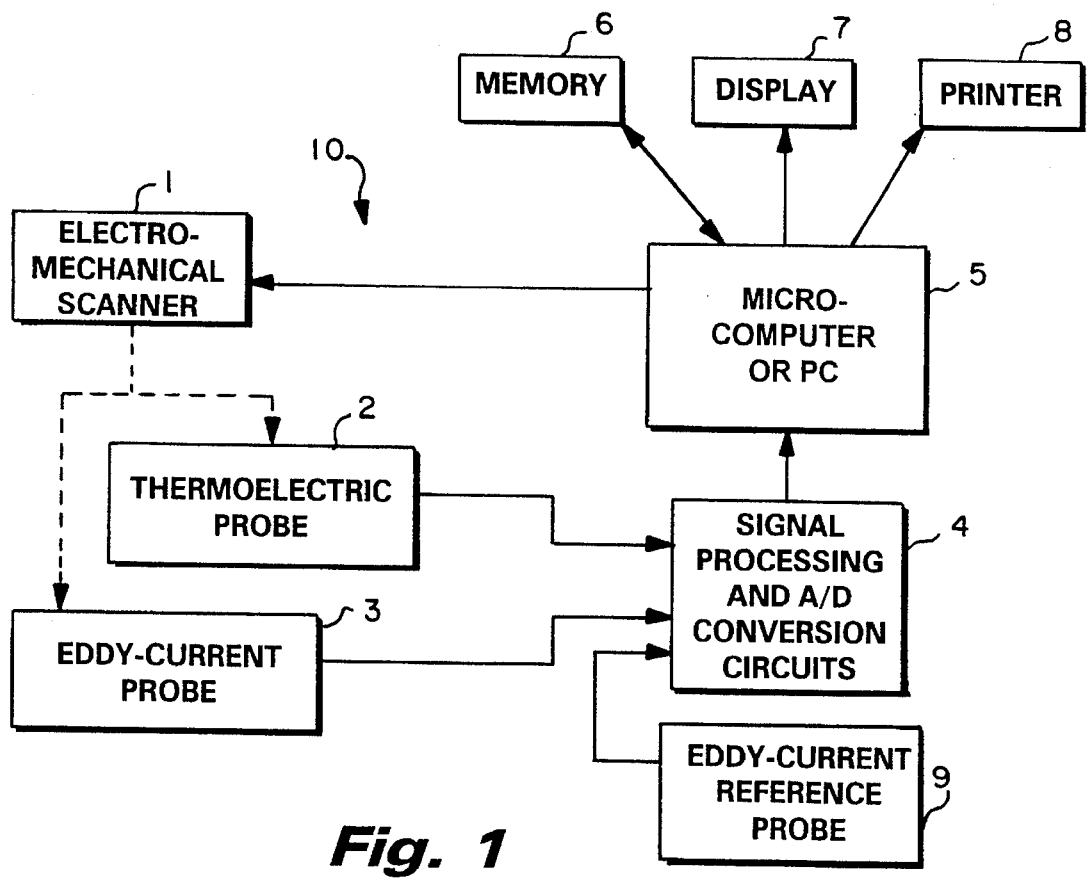
FIG. 1 is a diagrammatic illustration of the computer controlled mechanized scanning arrangement for use with both thermoelectric potential and eddy-current probes in accordance with the present invention.

FIG. 1 shows a diagrammatic illustration of an exemplary mechanized scanning arrangement for a mechanical scanner 1 particularly adapted for scanning the surface of a turbine bucket. The scanner may include a thermoelectric potential probe 2 and an eddy-current probe 3. However, the thermoelectric potential probe may be used independently of the eddy-current probe.

Thermoelectric signals generated by temperature and material differences between a bucket surface coating and its substrate are sensed by the thermoelectric probe and/or eddy-current probe and converted to data signals that are routed to a signal processor 4. The thermoelectric potential data signals may be indicative of the thermoelectric potential of the bucket as measured against a reference region, such as a known reference region on the turbine bucket. For the eddy current probe, the reference region may be a known region measured by a stationary probe 9 attached to the bucket. In addition, the probe is heated to locally heat the surface of the bucket. The temperature gradient set up in the locally heated surface affects the thermoelectric potential measured by the rolling probe head in a manner that is dependent upon the surface coating thickness of the bucket. Accordingly, the thermoelectric potential data signals vary in accordance with the thickness of the heated surface coating on the bucket.

The data signals are generally in an analog form when received from the probes and are converted into digital signals by analog-to-digital (A/D) convertor circuits in the signal processor 4. Once the signals have been converted, normalized and synchronized, the processed signals are routed to a computer 5 that may be a personal computer (PC) or micro-computer.

The computer 5 analyzes the data and calculates the local surface coating thickness using the reduced data from the thermoelectric probe of the inspected turbine bucket for the surface area covered by the thermoelectric probe. Similarly, the depth and location of any cracks in the bucket surface may be calculated by the computer using the reduced data from the eddy-current probe. The data calculations may be stored in memory 6, presented on a CRT display 7 or printed on a printer 8 connected to the computer. The processing of signals, data reduction and analysis is more fully described in the related application identified above.

Figure 4:
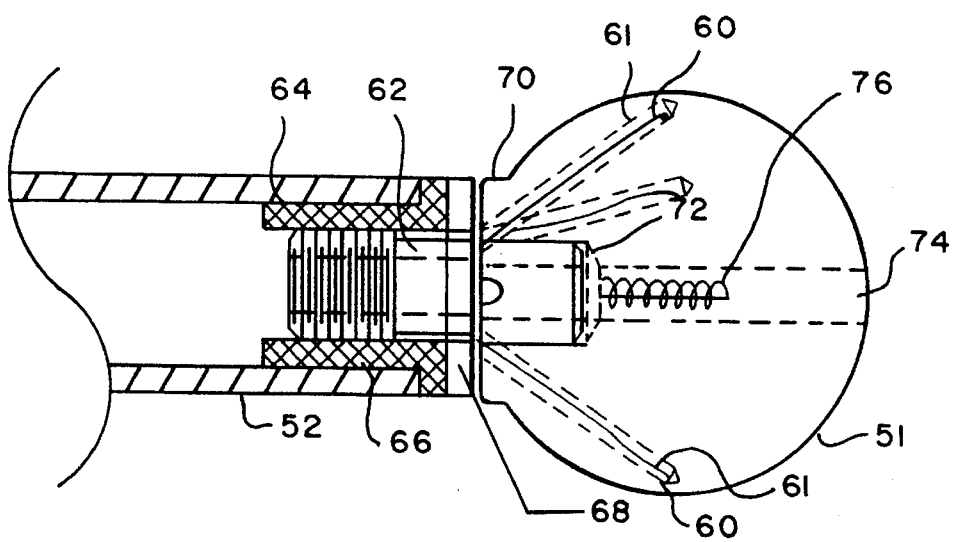
FIG. 4 is a partial cross-sectional view of an axle and probe head components.
Figures 2, 3:
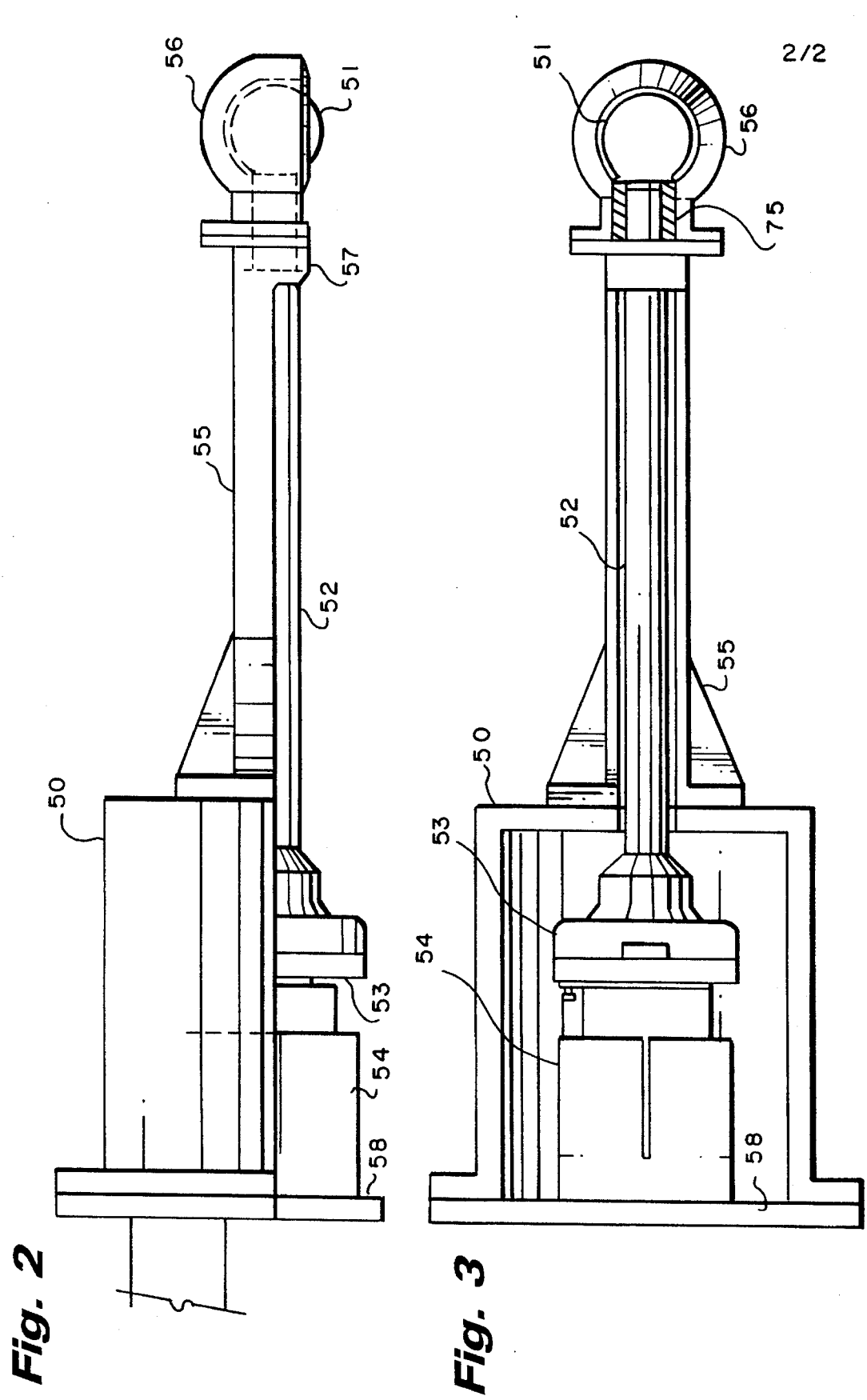
FIG. 2 is a side view of a preferred rolling-ball thermoelectric potential probe and support housing.
FIG. 3 is a bottom view of the thermoelectric potential probe and support housing depicted in FIG. 2.

FIGS. 2 to 4 show an embodiment of the rolling-ball thermoelectric probe wand and support structure in accordance with the present invention. The thermoelectric probe 50 consists of a Rhodium-plated copper rolling-ball probe head 51 mechanically connected via stainless steel axle tube 52 and hub assembly 53 to a rotational position encoder mechanism 54. The copper ball is preferably made of an OFHC oxygen-free hard material. Most of the other structural components of the rolling-ball probe may be formed of stainless steel. Imbedded in the rolling-ball head 51 are thermocouple wells (in other words recesses or thermocouple holes) 60 which contain thermocouples 61 that are connected by wires contained inside stainless steel (SS #304) tube 52 to external current-sensing circuits in the signal processor. The thermocouples 61 are used to sense the temperature of the rolling-ball head. One of the thermocouple leads, preferably a copper lead of a copper/constantine thermocouple 63 provides one of the connections for measuring the thermoelectric potential between the probe ball and the bucket. With such a thermocouple, a copper/constantine lead is brazed to the copper ball at the end of a well 60, so that the copper ball serves as one alloy of the thermocouple junction. A second thermocouple lead is connected to the base of the bucket.

The rotatable hub assembly 53 is attached to a stationary probe support base 58 and to one end of the rotatable axle tube 52. The hub assembly houses electrical slip-rings and thermocouple encoder circuits (conventional and, thus, not shown) for interfacing thermoelectric element heating currents 76 and electrical signals from the wires inside rotatable axle tube 52 to external circuits. The hub assembly also includes internal bearings that support the axle tube 52. The encoder housing 50 is rigidly mounted to support base 58.

The stationary probe housing arm 55 is rigidly mounted to the encoder housing 50. The arm provides an annular support bearing section 57 for supporting the far end of axle tube 52 and for allowing free rotation of head 51 and axle tube 52 about the axis of tube 52. A semi-hemispherical probe head housing section 56 attaches to probe housing arm 55 to seat and shield the rolling ball-head 51. The head housing also assists in minimizing drifting of the probe head off its intended path. An oil-free rotating bearing 75 supports the probe end of the axle tube 52 in the housing 56.

The probe head 51 is rigidly fixed to the axle 52 by a threaded post 62 that is received by an insulating bearing 66. The bearing 66 provides a threaded hole 64 in the axle tube 52 to receive a threaded section of the post for the ball probe. In addition, a graphite gasket 68 may be placed between the probe shoulder 70 and the end of the bearing. A post hole 72 in the shoulder end of the probe head receives the post 62. The post hole in the probe is shrink fitted on the post. The post 62 is hollow so that the wires from the thermocouples 61 and heater element may pass from the ball through the post and down the axle. In addition, an opening 74 for a cartridge heater may extend from the post hole to the opposite end of the head.

As rolling-ball probe head 51 is placed in contact and moved across the surface of a bucket in a direction perpendicular to the axis of tube 52, probe head 51 and axle tube 52 rotate while maintaining constant electrical contact with the surface. Rotations of the probe head 51 and axle tube 52 are converted to electrical signals by a conventional rotational encoder mechanism connected to hub assembly 53. The analog electrical signals are processed by the signal processor and by a computer for analysis of the surface of the turbine bucket blade.

The invention has been described in what is considered to be its preferred embodiment. The invention is not limited to this embodiment and covers various modifications and equivalent arrangements included within the spirit and scope of the appended claims.

What is claimed is:

1. A thermoelectric potential probe comprising:

a rotatable rolling-ball probe head for contacting a surface of a test object, said probe head being substantially spherical and having a plurality of internal thermocouples;

wherein said probe head is solely supported by a rotatable tubular axle having a first end fixedly attached to said probe head and a second end rotatably attached to a support base for said probe, and wherein said probe head has a plurality of holes, and said holes each of said plurality of thermocouples is disposed adjacent an outer surface of the probe head in a distal end of a respective one of said holes each having a proximate end adjacent the first end of the tubular axle, wherein each of the proximate ends are disposed at the outer surface of the probe head.

2. A probe as in claim 1 further comprising an internal thermal heating element disposed within an additional hole in said probe head.

3. A probe as in claim 1 wherein said plurality of holes is three holes arranged symmetrically about an axis of rotation of the probe head, and said plurality of thermocouples comprises three thermocouples each mounted in a respective one of said three holes in said probe head.

4. A probe as in claim 1 wherein said probe head is formed substantially of copper.

5. A probe as in claim 4 wherein said probe head is coated with Rhodium.

6. In a thermoelectric potential probe having a probe shaft with a first end supporting a rotatable rolling-ball probe head for contacting a test object, the rolling-ball probe head comprising:

a substantially spherical body having an outer surface and an axis of rotation about an axis of the probe shaft, and said body being rotatably attached to the first end of the probe shaft by a post extending between the body and probe shaft;

an internal thermal heating element within the body;

a plurality of holes in said body, wherein each hole has a distal end adjacent to the outer surface of the body and wherein the distal ends of the holes are arranged symmetrically about the axis of rotation, and each hole has a proximate end adjacent the post, wherein each of the proximate ends are disposed at the outer surface of the body, and a thermocouple mounted in the distal end of each of said holes.

7. In a thermoelectric potential probe having a probe shaft having a first end supporting a rotatable rolling-ball probe head for contacting a test object, wherein the rolling-ball probe head comprises:

a substantially spherical body having a surface and an axis of rotation about an axis of the probe shaft;

an internal thermal heating element within the substantially spherical body;

a plurality of holes in said substantially spherical body, wherein each hole has a distal end proximate to the surface of the body and wherein the distal ends of the holes are arranged symmetrically about the axis of rotation, and a thermocouple mounted in the distal end of each of said holes, and wherein the substantially spherical body includes a substantially flat shoulder region and said plurality of holes each has a proximate end in said shoulder region.

8. A rolling-ball probe head as in claim 7 wherein the plurality of holes is three holes.

* * * * *